United States Patent
Lai et al.

(10) Patent No.: US 8,422,151 B2
(45) Date of Patent: Apr. 16, 2013

(54) WIDE-ANGLE IMAGING LENS MODULE

(75) Inventors: Shu-Tzu Lai, Taichung (TW); Fei-Hsin Tsai, Taichung (TW); Chun-Sheng Lee, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 0 days.

(21) Appl. No.: 13/224,275

(22) Filed: Sep. 1, 2011

(65) Prior Publication Data
US 2013/0057969 A1    Mar. 7, 2013

(51) Int. Cl.
*G02B 9/34*    (2006.01)
*G02B 3/02*    (2006.01)
*G02B 13/18*   (2006.01)

(52) U.S. Cl.
USPC .......................... 359/780; 359/715

(58) Field of Classification Search .......... 359/715, 359/780
See application file for complete search history.

(56) References Cited

U.S. PATENT DOCUMENTS
2005/0046970 A1 *   3/2005   Amanai .................. 359/771

* cited by examiner

*Primary Examiner* — William Choi

(57) ABSTRACT

The wide-angle imaging lens module includes four lenses arranged from an object side to an image side in a sequence of: the first lens, having a positive refractive power, a convex surface on the object side and at least one aspheric surface; a diaphragm; the second lens, having a positive refractive power, a concave surface on the object side and at least one aspheric surface; the third lens, having a positive refractive power, a concave surface on the object side and at least one aspheric surface; the fourth lens, having a negative refractive power, a convex surface on the object side and at least one aspheric surface. The first and the second lenses perform a symmetry concave, providing the wider field of view angle and the larger aperture. A structural design that allows lenses to restrain better aberrations performances of aspheric surfaces further provides high-definition and high imaging qualities.

9 Claims, 6 Drawing Sheets

Non-point aberration and distorted aberration

Spherical surface aberration

Focal length : f = 1.55 mm $\quad \frac{|f_1|}{|f_2|} = 5.81 \quad \frac{|f_2|}{|f_3|} = 1.559 \quad \frac{|f_3|}{|f_4|} = 1.011 \quad \frac{|f|}{|TL|} = 0.418$
(F NO.) : F 2.4
Viewing angle : 2ω= 87° $\quad \frac{|f_{234}|}{|f|} = 1.032 \quad \frac{|f_{23}|}{|f|} = 0.603 \quad \frac{|f_{34}|}{|f|} = 8.315$

| Surf | Radius | Thickness | nd | Vd |
|---|---|---|---|---|
| OBJ | Infinity | Infinity | | |
| 1 | Infinity | 0 | | |
| 2 | 5.318795 | 0.7 | | |
| 3 | 42.7279 | 0.35 | 1.535 | 56 |
| STO | Infinity | 0.1 | | |
| 5 | -3.39868 | 0.46 | 1.535 | 56 |
| 6 | -0.83326 | 0.048 | | |
| 7 | -1.59619 | 0.83 | 1.535 | 56 |
| 8 | -0.55547 | 0.04 | | |
| 9 | 1.878012 | 0.34 | 1.607 | 27 |
| 10 | 0.499591 | 0.19 | | |
| 11 | Infinity | 0.21 | 1.5168 | 64.167336 |
| 12 | Infinity | 0.435 | | |
| IMA | Infinity | | | |

SURFACE DATA DETAIL:

| Surface 2 | | Surface 4 | | Surface 5 | | Surface 6 | |
|---|---|---|---|---|---|---|---|
| K : | 12.64599 | K : | 204.5183 | K : | 50.49135 | K : | -9.26492 |
| A : | 0.104627 | A : | 0.418171 | A : | -0.27615 | A : | -1.46781 |
| B : | -0.03276 | B : | -0.90458 | B : | -4.01509 | B : | 4.25119 |
| C : | 0.021699 | C : | 1.895418 | C : | 64.74798 | C : | -6.05022 |
| D : | -0.0062 | D : | -2.02381 | D : | -440.542 | D : | 0.859939 |
| E : | 0.004602 | E : | 0.793914 | E : | 1382.377 | E : | 1.708994 |
| Surface 7 | | Surface 8 | | Surface 9 | | Surface 10 | |
| K : | -51.0684 | K : | -2.31109 | K : | -3.922 | K : | -4.78006 |
| A : | -0.7595 | A : | -0.88639 | A : | -2.00761 | A : | -0.60582 |
| B : | 3.005561 | B : | 2.141038 | B : | 4.045201 | B : | 0.777867 |
| C : | -4.38175 | C : | -4.07333 | C : | -5.58292 | C : | -0.67204 |
| D : | 2.675006 | D : | 4.119958 | D : | 4.179736 | D : | 0.2972 |
| E : | -0.40691 | E : | -1.37651 | E : | -1.20297 | E : | -0.05076 |

FIG. 1B

Non-point aberration and distorted aberration

Spherical surface aberration

Focal length : f = 1.86 mm   $\frac{|f_1|}{|f_2|} = 5.055$   $\frac{|f_2|}{|f_3|} = 0.364$   $\frac{|f_3|}{|f_4|} = 1.721$   $\frac{|f|}{|TL|} = 0.465$ (F NO.) : F 2.4

Viewing angle : 2ω= 77°   $\frac{|f_{234}|}{|f|} = 1.066$   $\frac{|f_{23}|}{|f|} = 0.703$   $\frac{|f_{34}|}{|f|} = 2.341$

| Surf | Radius | Thickness | nd | Vd |
|---|---|---|---|---|
| OBJ | Infinity | Infinity | | |
| 1 | Infinity | 0 | | |
| 2 | 2.941158 | 0.73737 | | |
| 3 | 10.81993 | 0.370859 | 1.535 | 56 |
| STO | Infinity | 0.151925 | | |
| 5 | -3.33311 | 0.605286 | 1.535 | 56 |
| 6 | -0.66776 | 0.086068 | | |
| 7 | -0.55646 | 0.426908 | 1.535 | 56 |
| 8 | -0.55922 | 0.05 | | |
| 9 | 1.630445 | 0.449055 | 1.632 | 23 |
| 10 | 0.689484 | 0.240296 | | |
| 11 | Infinity | 0.21 | 1.5168 | 64.167336 |
| 12 | Infinity | 0.24 | | |
| 13 | Infinity | 0.4 | 1.5168 | 64.167336 |
| 14 | Infinity | 0.045 | | |
| IMA | Infinity | | | |

SURFACE DATA DETAIL:

| Surface 2 | | Surface 3 | | Surface 5 | | Surface 6 | |
|---|---|---|---|---|---|---|---|
| K : | 1.326528 | K : | 148.0407 | K : | 29.39661 | K : | -3.10587 |
| A : | 0.064642 | A : | 0.2219 | A : | -0.09722 | A : | -0.88718 |
| B : | 0.010711 | B : | -0.38162 | B : | -5.67972 | B : | 1.015977 |
| C : | -0.01278 | C : | 0.452573 | C : | 43.31356 | C : | -1.62378 |
| D : | 0.012207 | D : | -0.28904 | D : | -167.2 | D : | -0.15889 |
| E : | -0.00315 | E : | 0.182265 | E : | 279.304 | E : | 1.777934 |
| F : | 0.002181 | F : | -0.24902 | F : | 128.3811 | F : | 1.559615 |
| Surface 7 | | Surface 8 | | Surface 9 | | Surface 10 | |
| K : | -3.15549 | K : | -2.70542 | K : | -0.87661 | K : | -5.6335 |
| A : | -0.81577 | A : | -0.86321 | A : | -0.87866 | A : | -0.29315 |
| B : | 1.25327 | B : | 1.195035 | B : | 1.213346 | B : | 0.258619 |
| C : | -0.53744 | C : | -1.18324 | C : | -1.27387 | C : | -0.17672 |
| D : | 1.360737 | D : | 0.336011 | D : | 0.701823 | D : | 0.059193 |
| E : | -0.06167 | E : | 0.433327 | E : | -0.14203 | E : | -0.00574 |
| F : | -1.74475 | F : | 0.05625 | F : | -0.00878 | F : | -0.00039 |

FIG. 2B

WIDE-ANGLE IMAGING LENS MODULE

BACKGROUND OF THE INVENTION

1. Field of the Invention

The present invention relates to the field of optical lenses, and more particularly to a four-piece and wide-angle imaging lens module capable of providing a wider field of view angle and a large aperture.

2. Description of the Prior Art

With the progress of techniques, 3C products with optical lenses are known by people. All 3C users also put more focus on functions of the optical lenses. Users hope that 3C products have not only a high definition of imaging quality which is closed to a camera, but functions of a wider field view angle and a larger aperture. Especially, people are in favor of driving recorders in recent years, so the wider field of view angle and the ability to identify in the dark become more important for the optical lenses.

However, speaking of arrangement and structural design of a whole section of lenses, there is no way to satisfy both needs of a wider field of view angle and a large aperture. In some cases, partial field of view angles and an aperture can be upgraded, but a need of minimizing the thickness for 3C products can not be satisfied. Not to mention that satisfying needs of high quality of imaging under conditions of providing a wider field of view angle and a large aperture.

As such, the present invention is arisen to obviate or at least mitigate the above mentioned disadvantages.

SUMMARY OF THE INVENTION

The main object of the present invention is to provide a wide-angle imaging lens module with a wider field of view angle and a larger aperture.

Apart from providing the wider field of view angle and the larger aperture, the second object of the present invention is to provide a wide-angle imaging lens module with thickness minimized and high imaging quality.

To achieve the above and other objects, the wide-angle imaging lens module includes a first lens, a second lens, a third lens and a fourth lens, arranged from an object side to an image side in a sequence of: the first lens, a diaphragm, the second lens, the third lens and the fourth lens.

The first lens has a positive refractive power, a convex surface on the object side, and having at least one aspheric surface. The second lens has a positive refractive power, a concave surface on the object side, and having at least one aspheric surface. The third lens has a positive refractive power, a concave surface on the object side, and having at least one aspheric surface. The fourth lens has a negative refractive power, a convex surface on the object side, and having at least one aspheric surface.

As such, the first lens and the second lens mentioned above can perform a symmetry concave to reach goals of providing the wider field of view angle and the larger aperture. A special design on structure that allows lenses to restrain performances of better aberrations of aspheric surfaces provides further advantages of high-definition and high imaging qualities.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1B is a schematic view showing the data of optical features and aspheric surface coefficients of an imaging lens module in accordance with a first preferred embodiment of the present invention;

FIG. 2B is a schematic view showing the data of optical features and aspheric surface coefficients of an imaging lens module in accordance with a second preferred embodiment of the present invention.

DETAILED DESCRIPTION OF THE PREFERRED EMBODIMENTS

Figure 1:
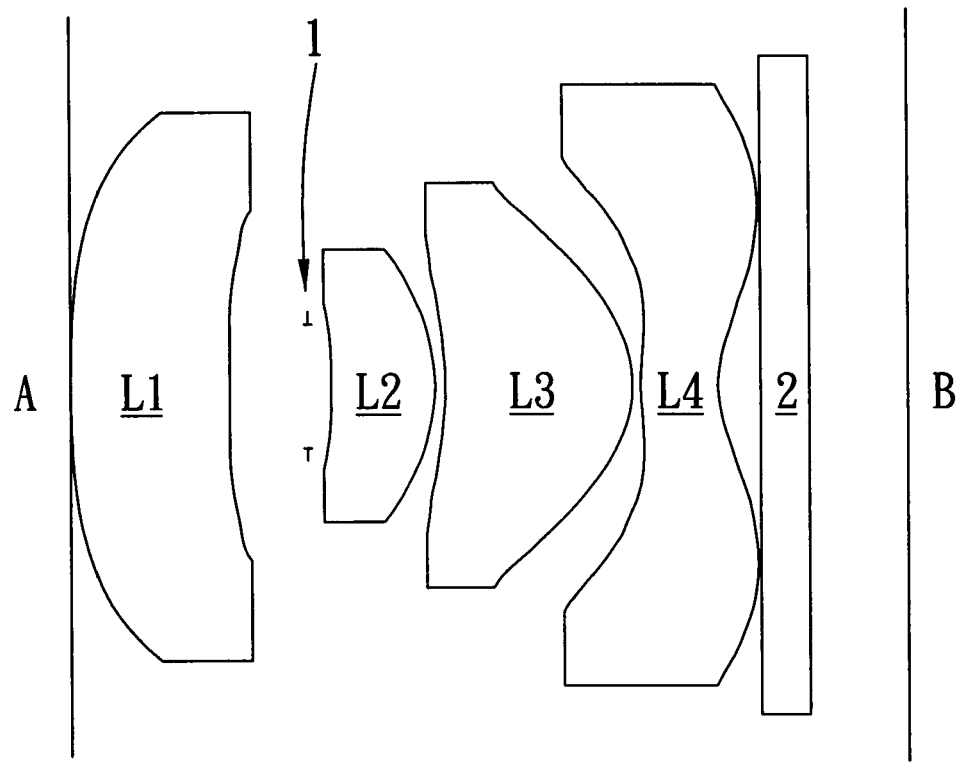
FIG. 1 is a schematic view showing an imaging lens module in accordance with a first preferred embodiment of the present invention.
Figure 2:
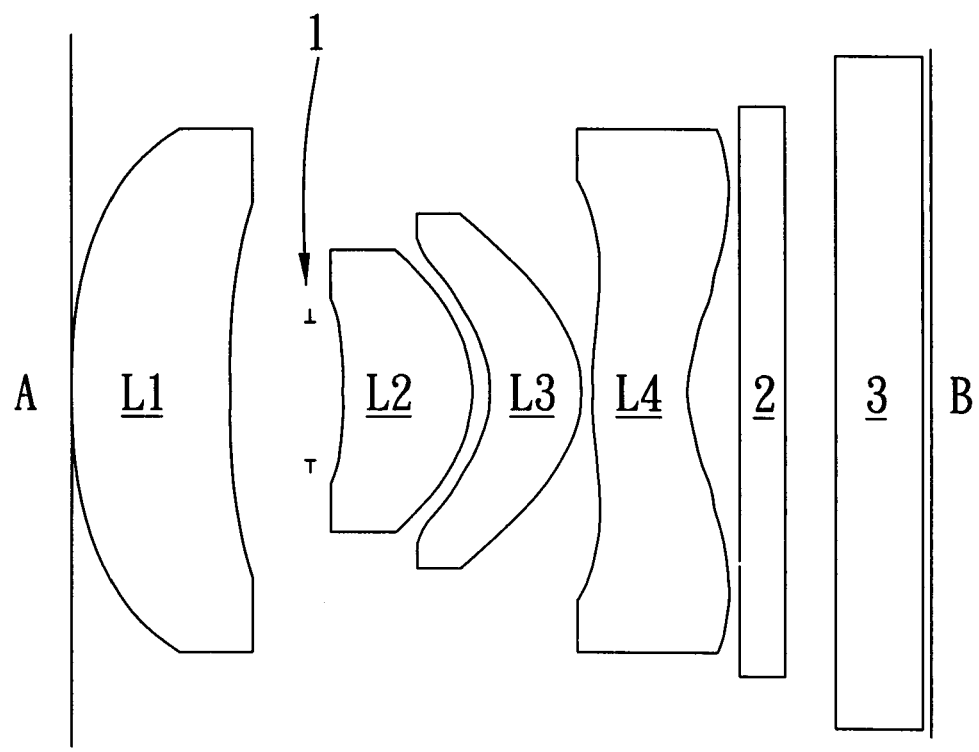
FIG. 2 is a schematic view showing an imaging lens module in accordance with a second preferred embodiment of the present invention.

FIG. 1 and FIG. 2 show schematic views of imaging lens module lens modules in accordance with the first, second and third preferred embodiments of the present invention respectively. Each imaging lens module includes a fixed aperture diaphragm and an optical module, which includes a first lens L1, a second lens L2, a third lens L3 and a fourth lens L4. The diaphragm 1 and the optical module are arranged from an object side A to an image side B in a sequence of: the first lens L1, the diaphragm 1, the second lens L2, the third lens L3 and the fourth lens L4.

The first lens L1 has a positive refractive power, a convex surface on the object side A, and having at least one aspheric surface. The second lens L2 has a positive refractive power, a concave surface on the object side B, and having at least one aspheric surface. The third lens L3 has a positive refractive power, a concave surface on the object side A, and having at least one aspheric surface. The fourth lens L4 has a negative refractive power, a convex surface on the object side B near an optic axis, and having at least one aspheric surface.

In the wide-angle imaging lens module composed of four lenses in accordance to the system of the invention, a first plate glass 2 is disposed behind the fourth lens L4, having a filtering infrared effect. In addition, a second plate glass 3 is installed before the image side B for providing an effect of protecting the light sensor and used for image sensors of different packages and providing a better imaging quality. Further, the image side B refers to a light sensor for capturing images, and the light sensor is a CCD or a CMOS.

Preferably, each lens in the imaging lens module is made of a plastic material so as to cut the cost of producing and managing down. Moreover, using plastic material allows lenses to restrain performances of the better aberration of the aspheric surface. The lens is used as an aspheric lens for providing a higher resolving power and reducing the number of lenses required for the imaging process, and achieving a goal of thinning out thickness of the lens module.

Figure 1A:
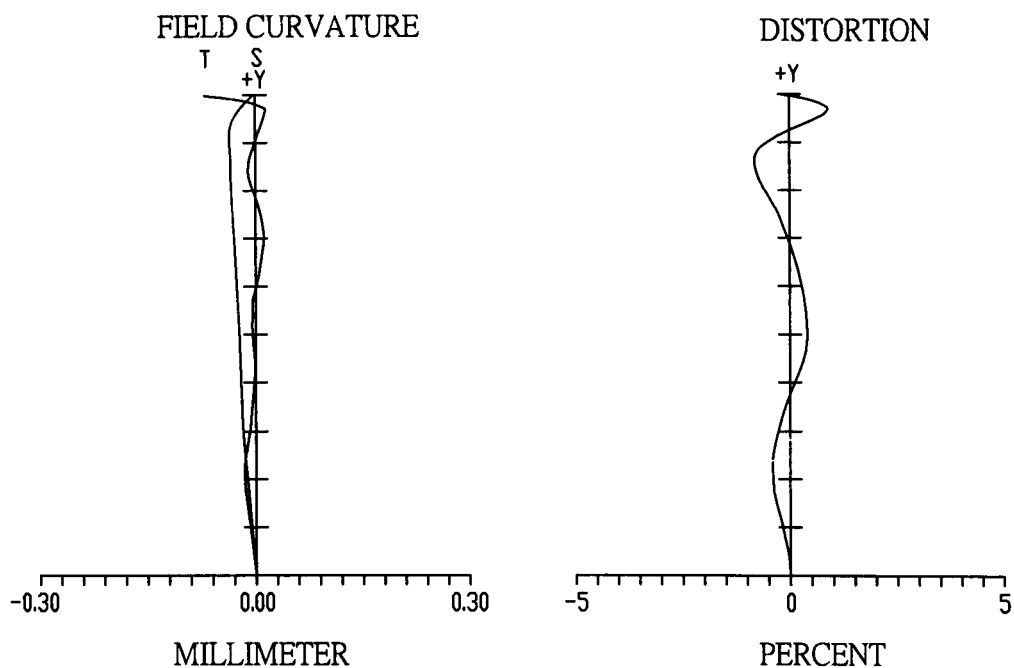
FIG. 1A is a schematic view showing the aberration of an imaging lens module in accordance with a first preferred embodiment of the present invention.
Figure 1A:
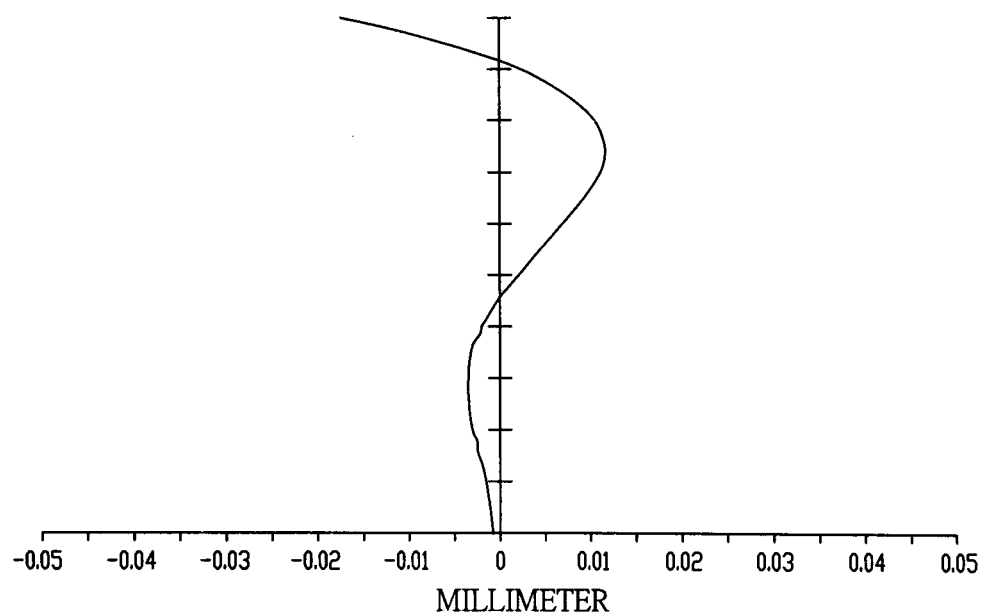
Figure 2A:
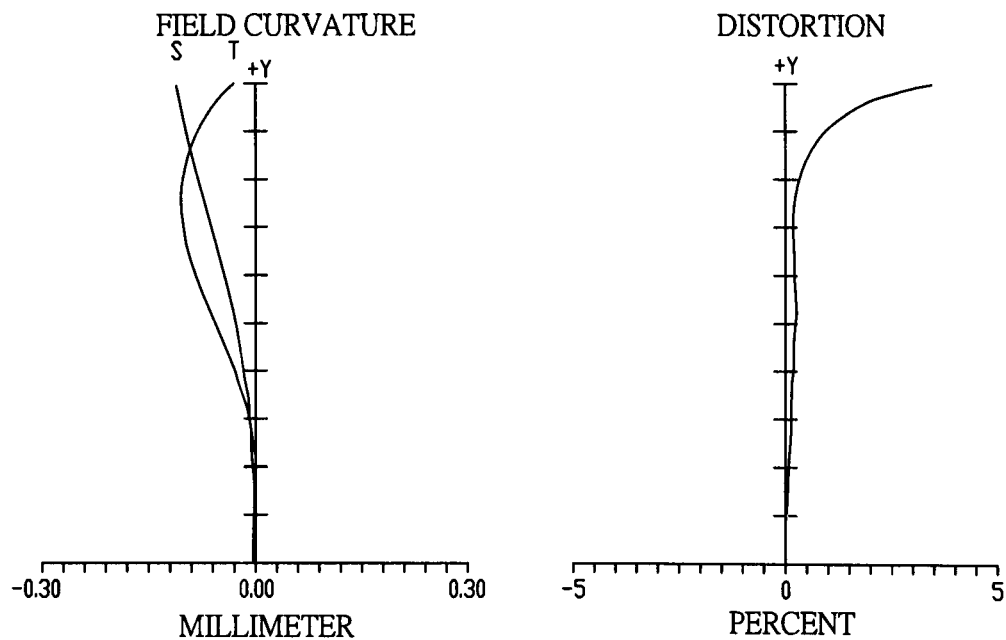
FIG. 2A is a schematic view showing the aberration of an imaging lens module in accordance with a second preferred embodiment of the present invention.
Figure 2A:
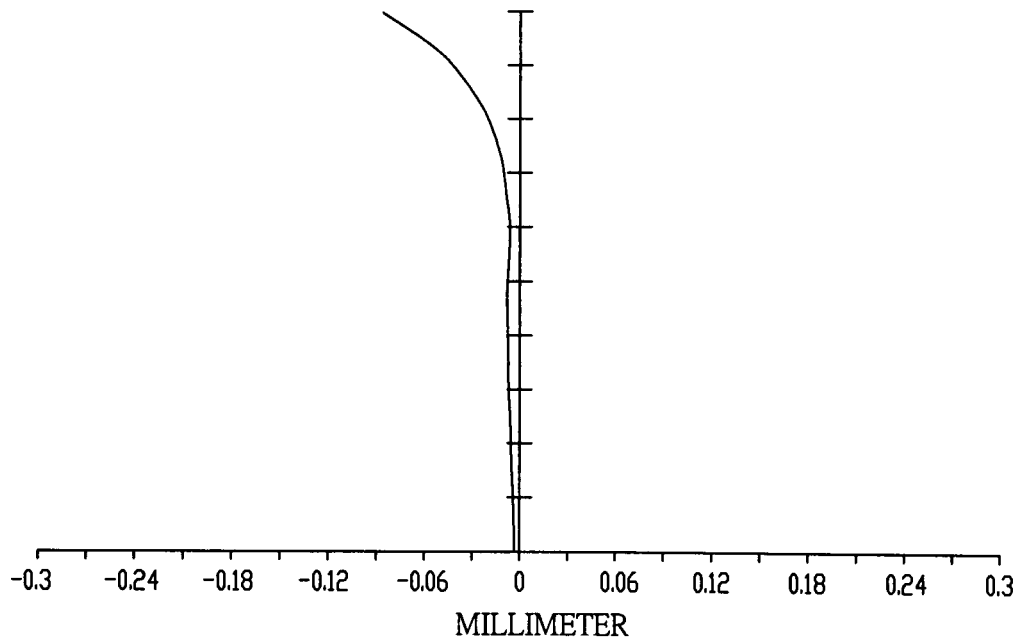

In addition, the schematic views of the aberration of the invention are non-point aberration, distorted aberration and spherical surface aberration as shown in FIG. 1A and FIG. 2A. Regardless of which aberration, the aberration relates to a data of a line d, and the non-point aberration relates to the data of an S image plane (SAGITTAL) which is related to the data of a T image plane (TANGENTIAL).

From the figures of the aberrations, the correction of the aberration of the invention is obtained completely from a simulated design, and thus there will be no problems in practical applications.

Refer to FIG. 1B and FIG. 2B for the data of aspheric surfaces in accordance with the first and second preferred embodiments of the invention, the data displayed at the top are numerals representing each lens or element of the optical module of the invention.

The value of F. No. shows the parameter of brightness. The smaller the value of F is, the higher the brightness is.

Viewing angle: 2ω.

Focal Length f: f is the overall focal length (mm) of the optical module, and 2, 3, 5, 6, 7, 8, 9, 10, 11, 12, 13, 14 listed below are numbers of lens surfaces counting in a sequence starting from the object side; the surface numbers 2, 3 represent two surfaces of the first lens L1, the surface numbers 5, 6 represent two surfaces of the second lens L2, the surface numbers 7, 8 represent two surfaces of the third lens L3, the surface numbers 9, 10 represent two surfaces of the fourth lens L4, and 11, 12, 13, 14 represent two surfaces of the first plate glass 2 and the second plate glass 3 respectively.

In the invention, the focal length value f1 of the first lens and the focal length value f2 of the second lens must satisfy the following relationship to achieve the best quality:

$$3.0<|f1|/|f2|<8.0$$

In the invention, the focal length value f2 of the second lens and the focal length value f3 of the third lens must satisfy the following relationship:

$$0.05<|f2|/|f3|<2$$

In the invention, the focal length value f3 of the third lens and the focal length value f4 of the fourth lens must satisfy the following relationship:

$$0.6<|f3|/|f4|<2.1$$

In the invention, the refractive index N4 of the fourth lens and the Abbe number V4 of the fourth lens must satisfy the following relationship to achieve high quality of imaging:

$$N4>1.57, V4<40$$

Also, the focal length value f of the whole lens module and the distance TL between the first surface of the first lens and an imaging surface must satisfy the following relationship:

$$0.2<|f/TL|<0.7$$

If the above relationship is not satisfied, the performance, the resolving power and the yield rate of the lens module will be decreased.

Since every lens of the lens module has at least one aspheric surface, the shape of the aspheric surface must satisfy the condition of the following formula:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

Where, z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

In the wide-angle imaging lens module of the present invention, the first lens L1 has a convex on the object side and a concave on the image side. The second lens L2 has a concave on the object side. Therefore, combination of the first lens L1 and the second lens L2 can reach a symmetry concave so that the view angle would be increased up to 87°. The characteristic of the wider field of view angle is performed as well. With the design of the wider field of view angle on the first lens, the brightness parameter can also be upgrade up to F2.4, having an advantage of brighter and larger aperture. As such, the wider field of view angle and the larger aperture can provide more sufficient light to enable the optical lenses to be used in the dark. Therefore, the optical lenses can also reach a better effect of identification and high-definition. On the other hand, an environment with sufficient light enhances imaging quality of the optical lenses.

Moreover, the aspheric surface is adopted by the first lens, the second lens, the third lens, and the fourth lens. The aspheric surface restrains the chromatism and the aberration. Meanwhile, the aspheric surface of the four lenses creates advantages of the wider field of view angle and the larger aperture for the wide-angle imaging lens module, reducing the amount of lenses that are used and minimizing the thickness of a loader.

What is claimed is:

1. A wide-angle imaging lens module, comprising a fixed aperture diaphragm, a first lens, a second lens, a third lens and a fourth lens arranged from an object side to an image side in a sequence of:

the first lens, having a positive refractive power, a convex surface on the object side, and having at least one aspheric surface;

the fixed aperture diaphragm;

the second lens, having a positive refractive power, a concave surface on the object side, and having at least one aspheric surface;

the third lens, having a positive refractive power, a concave surface on the object side, and having at least one aspheric surface;

the fourth lens, having a negative refractive power, a convex surface on the object side near the optic axis, and having at least one aspheric surface;

wherein $3.0<|f1|/|f2|<8.0$, and f1 is a focal length value of the first lens, f2 is a focal length value of the second lens.

2. The imaging lens module of claim 1, wherein $0.05<|f2|/|f3|<2$, and f2 is a focal length value of the second lens, f3 is a focal length value of the third lens.

3. The imaging lens module of claim 1, wherein $0.05<|f2|/|f3|<2$, and f2 is a focal length value of the second lens, f3 is a focal length value of the third lens.

4. The imaging lens module of claim 3, wherein $0.6<|f3|/|f4|<2.1$, and f3 is a focal length value of the third lens, f4 is a focal length value of the fourth lens.

5. The imaging lens module of claim 4, wherein $N4>1.57$, $V4<40$, and N4 is a refractive index of the fourth lens, V4 is an Abbe number of the fourth lens.

6. The imaging lens module of claim 5, wherein $0.2<|f/TL|<0.7$, and f is a focal length value of the whole lens module, TL is the distance between a first surface of the first lens and an imaging surface.

7. The imaging lens module of claim 1, wherein $0.6<|f3|/|f4|<2.1$, and f3 is a focal length value of the third lens, f4 is a focal length value of the fourth lens.

8. The imaging lens module of claim 1, wherein $N4>1.57$, $V4<40$, and N4 is a refractive index of the fourth lens, V4 is an Abbe number of the fourth lens.

9. The imaging lens module of claim 1, wherein $0.2<|f/TL|<0.7$, and f is a focal length value of the whole lens module, TL is the distance between a first surface of the first lens and an imaging surface.

* * * * *